(No Model.)
T. C. MAGGS.
CHECKREIN ATTACHMENT.
No. 514,761. Patented Feb. 13, 1894.
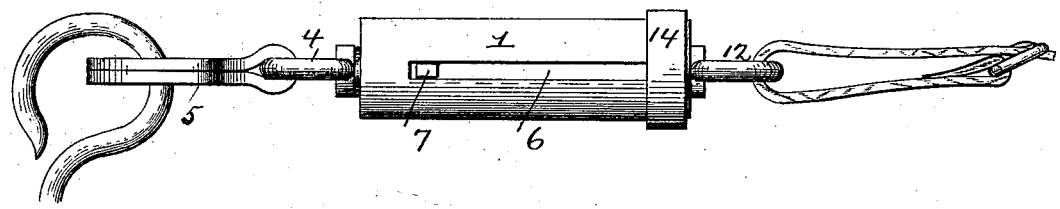
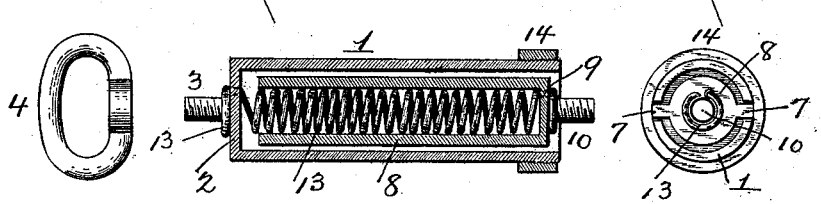 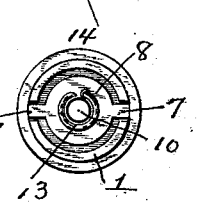
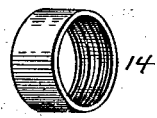 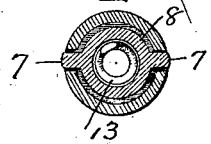
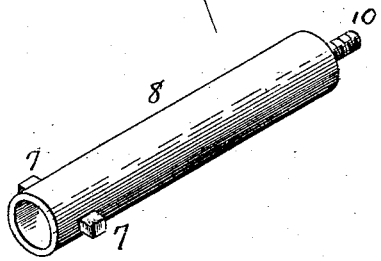 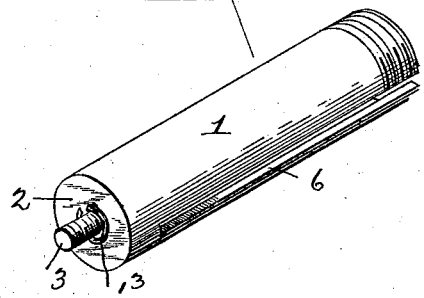
WITNESSES:
F. L. Ourand
Jo. L. Coombs
INVENTOR.
Thomas C. Maggs,
by Sims Dagger & Co.
Attorneys

UNITED STATES PATENT OFFICE.

THOMAS C. MAGGS, OF DETROIT, MICHIGAN.

CHECKREIN ATTACHMENT.

SPECIFICATION forming part of Letters Patent No. 514,761, dated February 13, 1894.

Application filed September 21, 1893. Serial No. 486,148. (No model.)

*To all whom it may concern:*

Be it known that I, THOMAS C. MAGGS, of Detroit, in the county of Wayne and State of Michigan, have invented certain new and useful Improvements in Checkrein Attachments; and I do hereby declare that the following is a full, clear, and exact description of the invention, which will enable others skilled in the art to which it appertains to make and use the same, reference being had to the accompanying drawings, which form a part of this specification.

My invention relates to improvements in tension devices used in connection with the check reins of harness whereby a yielding or spring connection is provided to counteract the effect of sudden jerks of the horse's head.

The invention consists in the novel construction and combination of parts hereinafter fully described and claimed.

In the accompanying drawings: Figure 1 is an elevation of a spring socket constructed in accordance with my invention. Fig. 2 is a central sectional view of the same. Figs. 3, 4, 5, 6 and 7, are detail views.

In the said drawings the reference numeral 1 designates a small metallic cylinder closed at one end by a head 2 provided with a screw threaded stud 3, with which is connected a loop 4. Secured to this loop is a strap 5 by which the device is connected with the check rein hook. This cylinder is formed with two horizontal aligned slots 6, to receive lugs 7, on a sleeve 8, located and slidable in the cylinder. This sleeve is closed at one end by a head 9, provided with a screw threaded stud 10, which receives a loop 12, to which the check rein is secured. Located within this sleeve is a coiled spring 13, the ends of which pass through holes in the heads 2 and 9, and are twisted around the studs 3 and 10. The numeral 14 designates a collar forming a stop for the said sleeve.

The operation will be readily understood. The device is connected with the check rein and check rein hook, and the tension of the coiled spring will be sufficient to properly hold the horse's head up, while at the same time it will give or yield to counteract the injurious effects of sudden jerks, the sleeve sliding in the cylinder and the lugs working in the slots 6, which form guides therefor.

Having thus described my invention, what I claim is—

A spring tension socket for check reins comprising the slotted cylinder, having one end closed and provided with a screw threaded stud, the loop connected therewith, the slidable sleeve located in said cylinder having lugs engaging with said slots, the screw threaded stud and loop, and the coiled spring having its ends passing through holes in the ends of said cylinder and sleeve and twisted around the said studs, substantially as described.

In testimony that I claim the foregoing as my own I have hereunto affixed my signature in presence of two witnesses.

THOMAS C. MAGGS.

Witnesses:
CHARLES M. JOHNSON,
JOHN H. POWELL.